United States Patent
Mishra et al.

(10) Patent No.: US 10,268,527 B2
(45) Date of Patent: Apr. 23, 2019

(54) SYSTEMS AND METHODS FOR GENERATING REAL TIME EVENTS

(71) Applicant: Tata Consultancy Services Limited, Mumbai (IN)

(72) Inventors: Ratan Kumar Mishra, Bhubaneswar (IN); Partha Sarathi Mishra, Bhubaneswar (IN); Nagesh Dora, Bhubaneswar (IN); Shibani Nanda, Bhubaneswar (IN)

(73) Assignee: Tata Consultancy Services Limited, Mumbai (IN)

( * ) Notice: Subject to any disclaimer, the term of this patent is extended or adjusted under 35 U.S.C. 154(b) by 32 days.

(21) Appl. No.: 15/467,886

(22) Filed: Mar. 23, 2017

(65) Prior Publication Data
US 2017/0293508 A1    Oct. 12, 2017

(30) Foreign Application Priority Data
Mar. 22, 2016  (IN) .............................. 201621010040

(51) Int. Cl.
*G06F 9/54* (2006.01)
*G06F 17/30* (2006.01)
*G06F 21/44* (2013.01)
*G06F 16/904* (2019.01)

(52) U.S. Cl.
CPC ............ *G06F 9/542* (2013.01); *G06F 16/904* (2019.01); *G06F 17/30516* (2013.01); *G06F 17/30994* (2013.01); *G06F 21/44* (2013.01)

(58) Field of Classification Search
CPC ..................................................... G06F 9/542
USPC ......................................................... 719/318
See application file for complete search history.

(56) References Cited

U.S. PATENT DOCUMENTS

| | | | |
|---|---|---|---|
| 8,977,600 B2 | 3/2015 | Crupit et al. | |
| 9,083,725 B2 | 7/2015 | Korangy et al. | |
| 9,092,502 B1 | 7/2015 | Cannaaliato et al. | |
| 9,392,010 B2* | 7/2016 | Friedman | H04L 63/102 |
| 9,596,253 B2* | 3/2017 | Chauhan | H04L 63/1425 |
| 2015/0213109 A1 | 7/2015 | Kassko et al. | |
| 2017/0262142 A1* | 9/2017 | Riley | G06F 3/0482 |

OTHER PUBLICATIONS

Wootton, "SAP HANA smart data streaming: an overview of integration options", SAP Community Network HANA Product Management, © 2014 SAP SE SE or an SAP SE affiliate company, pp. 1-10, (2014).
"The APAMA Platform", White paper, © 2016 Software AG, 20, pages, (2016).

* cited by examiner

*Primary Examiner* — Andy Ho
(74) *Attorney, Agent, or Firm* — Finnegan, Henderson, Farabow, Garrett & Dunner LLP

(57) ABSTRACT

Events generation systems and methods are provided. The system obtains, in real time, input stream data from one or more sources, filters, the input stream data by identifying one or more authentic sources to obtain filtered input stream data, parses, the filtered input stream data to obtain validated data in a specific data format, performs apply, in real time, an analysis on the validated data and on the corresponding one or more authentic sources by applying, at least one of one or more metadata driven logics and one or more predefined rules and further generates generate, in real time, one or more real time events based on the analysis.

12 Claims, 5 Drawing Sheets

Pipe burst location predicted by the events generation system performing analysis

SYSTEMS AND METHODS FOR GENERATING REAL TIME EVENTS

PRIORITY CLAIM

This U.S. patent application claims priority under 35 U.S.C. § 119 to: India Application No. 201621010040, filed on Mar. 22, 2016. The entire contents of the aforementioned application are incorporated herein by reference.

TECHNICAL FIELD

This disclosure relates generally to data processing techniques, and more particularly to systems and methods for generating real time events by analyzing input stream data.

BACKGROUND

Data processing is of utmost importance for most of entities such as organizations. Challenges remain in processing large number of data on Big Data platforms. For instance, one of the challenges typically faced by such organizations involves a scenario wherein input data is received from multiple sources. Data is captured from monitoring tools, and is received in multiple formats. Further, the challenge is in converting the received data into a standard format. Furthermore, such information are obtained from data sources and may be incomplete and contain partial information of the system components and dependencies spread across the system. It is therefore difficult to determine and validate the sources, and as well as the data. Existing techniques do not process/execute data in real time. Moreover, such existing technique fail to integrate with big data platform and are inefficient in complex events processing based on the input data.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below. In view of the foregoing, an embodiment herein provides systems and methods for generating real time events.

In one embodiment, a processor implemented method is provided. The method comprising obtaining, in real time, input stream data from one or more sources; filtering, in the real time, the input stream data by identifying one or more authentic sources from the one or more sources to obtain filtered input stream data; parsing, in the real time, the filtered input stream data such that the filtered input stream data is validated to obtain validated data in a specific data format; applying, in the real time, at least one of one or more metadata driven logics and one or more predefined rules on the validated data in the specific data format and the one or more authentic sources; performing, in the real time, an analysis on the validated data in the specific data format and on corresponding the one or more authentic sources; and generating, in the real time, one or more real time events based on the analysis. In one embodiment, the step of generating one or more real time events comprises performing a comparison of a specific timestamp from the input stream data with a predetermined threshold defined in the one or more predefined rules. In another embodiment, the step of generating one or more real time events comprises performing a comparison of a specific count from the input stream data with a predetermined threshold defined in the one or more predefined rules. In an embodiment, the method may further comprise communicating a notification message comprising a command to the one or more authentic sources based on the analysis.

In another embodiment, a system is provided. The system comprising a memory storing instructions; one or more communication interfaces; one or more hardware processors coupled to the memory using the one or more communication interfaces, wherein the one or more hardware processors are configured by the instructions to obtain, in real time, input stream data from one or more sources, filter, in the real time, the input stream data by identifying one or more authentic sources from the one or more sources to obtain filtered input stream data, parse, in the real time, the filtered input stream data such that the filtered input stream data is validated to obtain validated data in a specific data format, apply, in the real time, at least one of one or more metadata driven logics and one or more predefined rules on validated data in the specific data format and the one or more authentic sources, perform, in the real time, an analysis on the validated data in the specific data format and on corresponding the one or more authentic sources, and generate, in the real time, one or more real time events based on the analysis. In an embodiment, the one or more real time events may be generated by performing a comparison of a specific timestamp from the input stream data with a predetermined threshold defined in the one or more predefined rules. In another embodiment, the one or more real time events may be generated by performing a comparison of a specific count from the input stream data with a predetermined threshold defined in the one or more predefined rules. The one or more hardware processors may be further configured by the instructions to communicate a notification message comprising a command to the one or more authentic sources based on the analysis.

In yet another embodiment, one or more non-transitory machine readable information storage mediums comprising one or more instructions is provided. The one or more instructions which when executed by one or more hardware processors causes obtaining, in real time, input stream data from one or more sources; filtering, in the real time, the input stream data by identifying one or more authentic sources from the one or more sources to obtain filtered input stream data; parsing, in the real time, the filtered input stream data such that the filtered input stream data is validated to obtain validated data in a specific data format; applying, in the real time, at least one of one or more metadata driven logics and one or more predefined rules on the validated data in the specific data format and the one or more authentic sources; performing, in the real time, an analysis on the validated data in the specific data format and on corresponding the one or more authentic sources; and generating, in the real time, one or more real time events based on the analysis. In one embodiment, the step of generating one or more real time events comprises performing a comparison of a specific timestamp from the input stream data with a predetermined threshold defined in the one or more predefined rules. In another embodiment, the step of generating one or more real time events comprises performing a comparison of a specific count from the input stream data with a predetermined threshold defined in the one or more predefined rules. In an embodiment, the one or more instructions which when executed by one or more hardware processors further causes communicating a notification message comprising a command to the one or more authentic sources based on the analysis.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
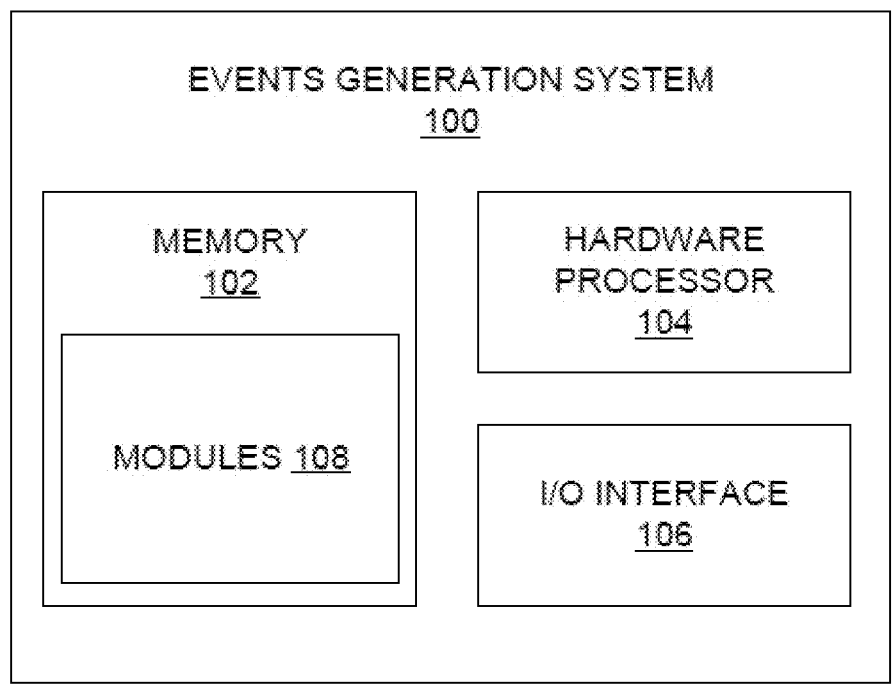
FIG. 1 is a block diagram of an events generation system according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a block diagram of an events generation system 100 according to an embodiment of the present disclosure. The terms "event generation system" and "system" may be interchangeably used herein after. The system 100 comprises a memory 102, a hardware processor 104, and an input/output (I/O) interface 106. Although the exemplary block diagram and the associated description refers to a memory and a hardware processor, it may be understood that one or more memory units and one or more hardware processors may be comprised in the event generation system 100. The memory 102 further includes one or more functional modules 108. The memory 102, the hardware processor 104, the input/output (I/O) interface 106, and/or the modules 108 may be coupled by a system bus or a similar mechanism. The event generation system 100 generates one or more real time events for given input stream data received from (or obtained from) one or more sources. The one or more sources may comprise, for example but are not limited to, Wi-Fi Routers, SCADA Systems, Pressure Reducing Valves (PRV), Water Meters, Global Positioning Systems (GPS), sensors, and the like. The input stream data is parsed and filtered by the system 100 based on information received from the one or more sources (not shown in FIG. 1) through one or more networks (not shown in FIG. 1).

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, information (e.g., time series data) received from the one or more sensors (not shown in FIG. 1) through the one or more networks (not shown in FIG. 1).

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

Figure 5:
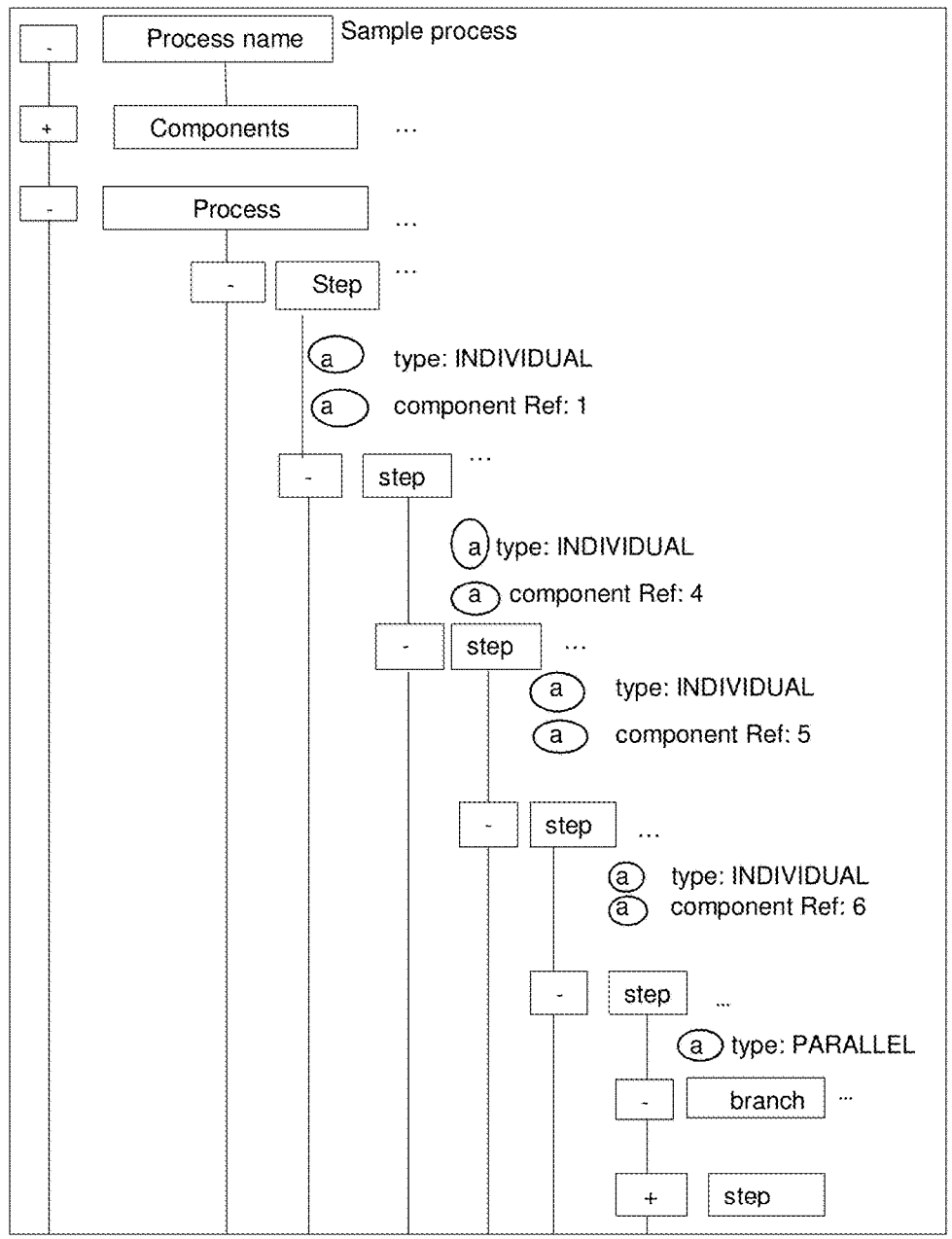
FIG. 5 is an example of a metadata structure that includes one or more processes according to an embodiment of the present disclosure.

The modules 108 may comprise, for example, a process engine initializer that is configured to initialize process engine associated beans (also referred as "business functions") by reading one or more processes from metadata structure as shown in FIG. 5. The process engine initializer is further configured to cache the process flows (e.g., process metadata being cached). The modules 108 may further comprise a process engine metadata implements the cached process flows and individual task metadata during a runtime execution. The modules 108 may further comprise a process engine executor that executes one or more processes by receiving real time events/feeds. For example, the process engine executor may receive metadata definition of process parallelism and underline big data platform for process execution. Unlike conventional systems or methods where they fails to handle with multiple data formats of inputs, the process engine executor obtains (or receives) one or more input stream data pertaining to one or more protocols (e.g., http, https, jmh, mqtt, and the like) in one or more formats for example, an Extensible Markup Language (XML) format, a JavaScript Object Notation (JSON) format, a Comma Separated Values (CSV) format, and the like. Furthermore, the process engine executor is configured to execute one or more predefined rules from a rule base repository (e.g., Drools Workbench) stored in the memory 102. The module 108 may further comprise a process engine monitor that is configured to create one or more proxies around one or more individual tasks to monitor one or more process flows and corresponding statuses, and perform audit of data flow during process execution.

Figure 2:
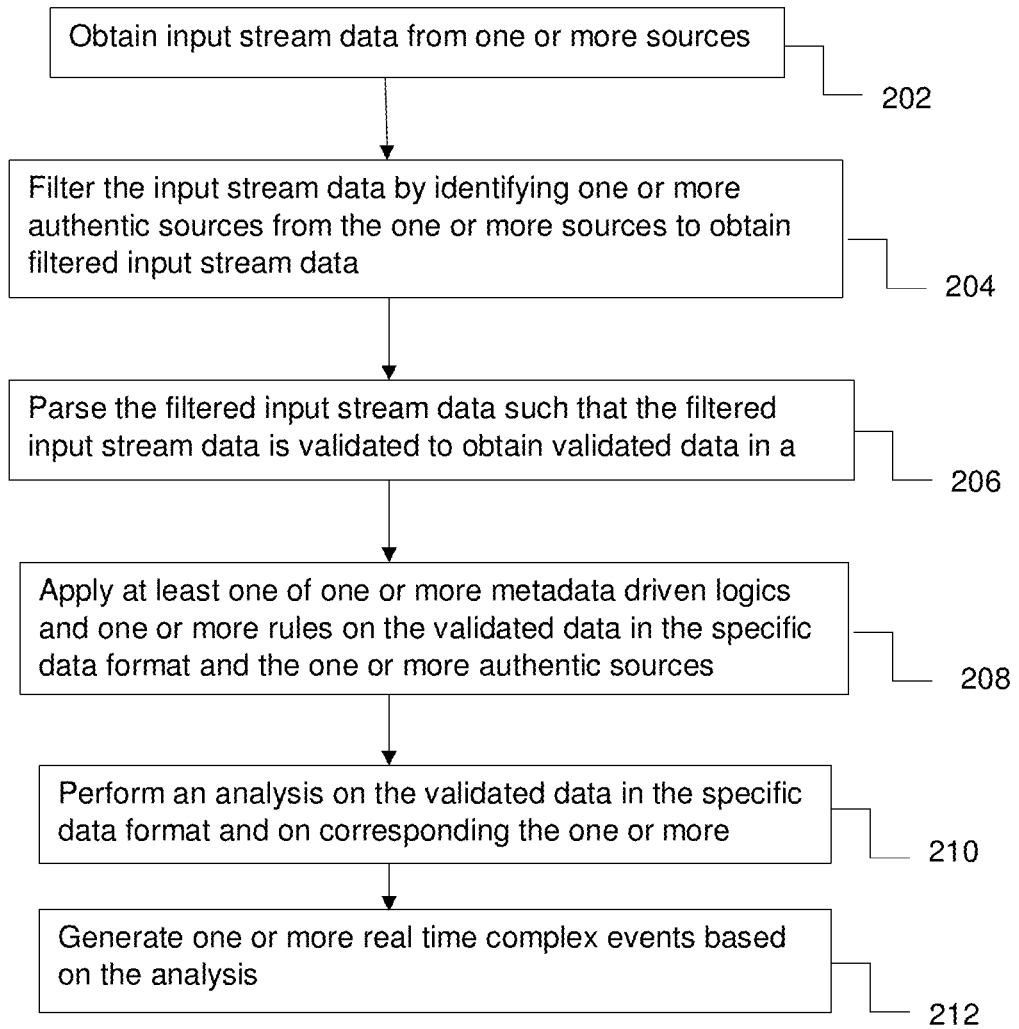
FIG. 2 is a flow diagram illustrating a processor implemented method for generating real time events using the event generation system of FIG. 1 according to an embodiment of the present disclosure.

FIG. 2, with reference to FIG. 1, is a flow diagram illustrating a processor implemented method for generating real time events using the event generation system 100 according to an embodiment of the present disclosure. The steps of the method of the present disclosure will now be explained with reference to the components of the system 100 as depicted in FIG. 1. The hardware processor 104 is configured by the instructions stored in the memory 102. The hardware processor 104 when configured by the instructions generates one or more events (e.g., simple, medium, and/or complex) as described hereinafter. In an embodiment, at step 202, the hardware processor 104 obtains input stream data (e.g., Wi-Fi data, Global Positioning System (GPS) data, data from supervisory control and data acquisition (SCADA) such as water flow rate, pressure rate, and the like) from one or more sources (e.g., pressure sensor, heat sensor, and the like). Input stream data may further include data coming from one or more intelligent personal assistants such as Speech Interpretation and Recognition Interface (Siri), and the like residing on one or more operating systems associated with computer systems and mobile communication devices. In step 204, the hardware processor 104 filters the input stream data by identifying one or more authentic sources from the one or more sources to obtain filtered input stream data. Sources that are registered (and/or subscribed to the events generation system 100 are identified as the one or more authentic sources. The step of filtering the input stream data also helps the events generation system to identify source(s) that are not authentic, and tag that source under a blacklist. For example, sources transmitting input stream data with an unusual pattern can be identified as a source not registered to the event generation system 100, and can be tagged under blacklist.

In step 206, the hardware processor 104 parses the filtered input stream data such that the filtered input stream data is validated to obtain validated data in a specific data format. In step 208, the hardware processor 104 applies at least one of one or more metadata driven logics and one or more rules on (i) the validated data in the specific data format and (ii) one or more authentic sources. In one embodiment, the one or more metadata driven logics and one or more predefined rules are applied on the one or more authentic sources due to the data nature. The one or more metadata driven logics and the one or more predefined rules are stored in the memory 102 and/or a cache (which may be integral part of the memory 102). In another embodiment, the events generation system 100 may invoke the one or more metadata driven logics and one or more predefined rules from an external repository stored on one or more computing devices or cloud environments. For instance, the one or more metadata driven logics and one or more predefined rules may be invoked from the external repository through an external rule engine to output events/alerts in real time.

In step 210, the hardware processor 104 performs an analysis on the validated data in the specific data format and on corresponding the one or more authentic sources. In an embodiment, the events generation system 100 performs analysis in real time on the validated date through an in-memory processing using distributed caching mechanism (cluster mode), where cache is also be distributed. In step 212, the hardware processor 104 generates one or more real time events based on the analysis. In one embodiment, an analysis such as a comparison of a specific timestamp from the input stream data with a predetermined threshold defined in the one or more predefined rules may be performed. For example, assuming that input stream data comprises wait time of people waiting at a bus stop to board a bus, which is a specific timestamp, and the predefined threshold be 5 minutes. Assume the wait time is 10 minutes. The wait time is compared with the predetermined threshold. In this scenario, since the wait time is greater than the predetermined threshold, the events generation system 100 generate an event (e.g., an alert), and the same is communicated to a corresponding entity (e.g., a bus driver), or a travel agent. In another embodiment, an analysis such as a comparison of a specific count from the input stream data with a predetermined threshold defined in the one or more rules may be performed. For example, assuming that the input stream comprise count specific to people at a bus stop for boarding a bus, and the predetermined threshold 10. Assume that the count is 20. The count (e.g., 20—number of people waiting in queue at a bus terminal) is compared with the predetermined threshold (e.g., 10 maximum number of people waiting in queue at a bus terminal as defined in the system 100). In this scenario, the count is greater than the predetermined threshold, the events generation system 100 may generate an event and the same is communicated to a corresponding entity (e.g., a bus driver), or a travel agent. This may enable to improve one or more services offered by service providers (e.g., travel agents).

Further, the events generation system 100 enables the hardware processor 104 to generate and communicate a notification message comprising a command to the one or more authentic sources based on the analysis. For example, assuming that the input stream data comprises water flow rate for different timestamps. The input stream data may further comprise the water pressure. This information for example, water flow rate, and the water pressure, may be analyzed by applying one or more metadata driven logics and/or one or more predefined rules on the water flow rate, and the water pressure and corresponding events may be generated. Based on the analysis, the events generation system 100 may communicate a notification message comprising a command to a water supply department. The notification message may indicate a certain portion of pipeline supplying water that may be burst in the future. The notification message may include a command to shut down corresponding valve and stop the water supply, and get it rectified/replaced. The water supply department may process this command providing appropriate instructions to a control unit. The control unit upon receiving the command may perform one or more actions. In an embodiment, one or more actions may comprise, but are not limited to, shutting down operations of a particular component that is likely to dysfunction.

Figure 3:
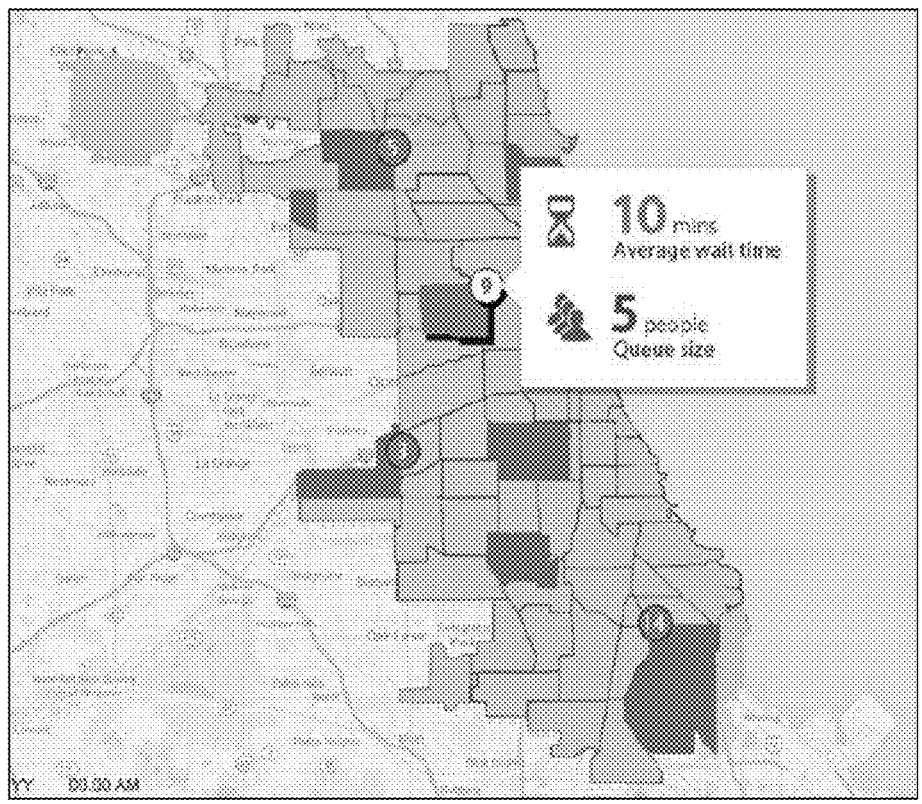
FIG. 3 is a representation of one or more events generated by the events generation system of FIG. 1 according to an embodiment of the present disclosure.

FIG. 3, with reference to FIGS. 1-2, is a representation of one or more events generated by the events generation system 100 according to an embodiment of the present disclosure. Below is an illustrative example of input stream data (e.g., Wi-Fi data):

"Current Time","Client Ip Address","Client MacAddress","Association Time","Vendor","Ap Name","Wifi-Name","Map Location","SSID","Profile","Session Duration","Average Session ThroughPut","Ap MacAddress","Ap Ip","Device Ip","Dissociation Time"

"20150813143000","127.0.0.1","a2:d2:e6:17:4b:29", "20150813135100","vendor1","AP Depot Shelter 23", "wifi1","41.8799021054578,−87.6975253519201", "ssid1","client profile","0","153","0d:9e:12:34:d1:a1","127.0.0.1","127.0.0.1","0"

"20150813143000","127.0.0.1","a2:f8:84:f7:ec:23", "20150813135100","vendor1","AP Depot Shelter 23", "wifi1","41.8799021054578,−87.6975253519201", "ssid1","client profile","0","172","0d:9e:12:34:d1:a1","127.0.0.1","127.0.0.1","0"

"20150813143000","127.0.0.1","a2:1b:56:ce:75:06", "20150813135100","vendor1","AP Depot Shelter 23", "wifi1","41.8799021054578,−87.6975253519201", "ssid1","client profile","0","174","0d:9e:12:34:d1:a1","127.0.0.1","127.0.0.1","0"

"20150813143000127.0.0.1","a2:86:26:1c:0f:25", "20150813135100","vendor1","AP Depot Shelter 23", "wifi1","41.8799021054578,−87.6975253519201", "ssid1","client profile","0","127","0d:9e:12:34:d1:a1","127.0.0.1","127.0.0.1","0"

"20150813143000","127.0.0.1","a2:cd:53:54:e4:13", "20150813135100","vendor1","AP Depot Shelter 23", "wifi1","41.8799021054578,−87.6975253519201", "ssid1","client profile","0","181","0d:9e:12:34:d1:a1","127.0.0.1","127.0.0.1","0"

The above illustrative input stream data was filtered, parsed and validated. The validated data was then analyzed by applying one or more metadata driven logics and/or one or more predefined rules to generate one or more events as depicted in FIG. 3. As depicted in FIG. 3, the events are generated in terms of alerts, for example, 10 minutes is average wait time, and queue size is 5 people who are standing at a bus stop to board a bus. The events may be delivered to one or more client devices (e.g., in this case travel agents) through one or more communication mediums for example, Big Data systems, File Systems, OLAP systems, Email, Social networks, through message push protocols, and the like.

Figure 4:
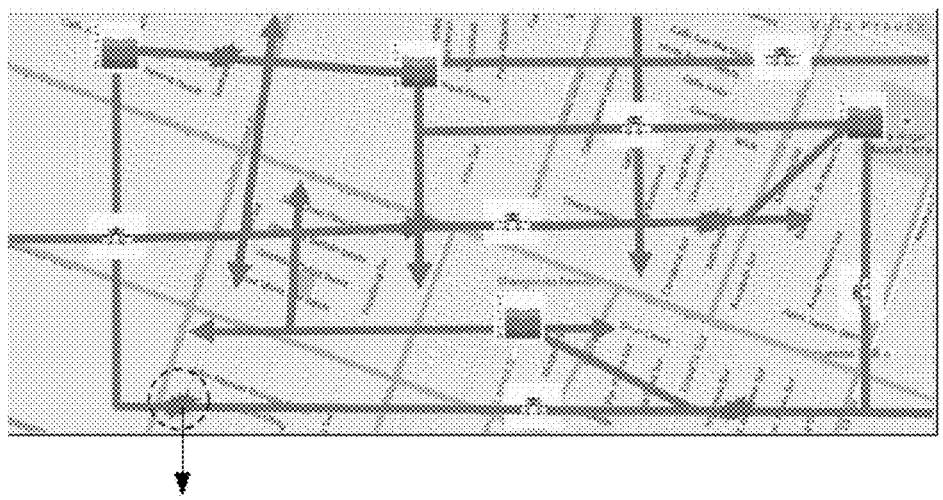
FIG. 4 is a representation of one or more events and notification messages communicated by the events generation system of FIG. 1 according to an embodiment of the present disclosure.

FIG. 4, with reference to FIGS. 1-3, is a representation of one or more events and notification messages communicated by the events generation system 100 according to an embodiment of the present disclosure. FIG. 4 illustrates prediction of pipe burst location by the events generation system 100. An illustrative example of the input stream data (e.g., sensor data from a water supply department) is provided below:

"SNS102","SUBDMA10","20151118","14:00:00", "66.5","F","698.42","lps","350","MGa"

"SNS79","SUBDMA24","20151118","14:00:00", "67.4","F","758.11","lps","600","MGa"

"SNS83","SUBDMA29","20151118","14:00:00", "67.4","F","680.7","lps","400","MGa"

"SNS76","SUBDMA36","20151118","14:00:00", "60.8","F","879.6","lps","147.6","MGa"

"SNS111","SUBDMA37","20151118","14:00:00", "61.8","F","831.24","lps","100","MGa"

"SNS118","SUBDMA39","20151118","14:00:00","65", "F","1011.23","lps","780","MGa"

"SNS81","SUBDMA41","20151118","14:00:00", "66.1","F","1033.81","lps","9999","MG a"

"SNS85","SUBDMA45","20151118","14:00:00", "64.2","F","727.8","lps","150","MGa"

SNS denotes an illustrative a unique identifier (e.g., MAC address) of a connected computing device (e.g., a laptop, a mobile communication device, and the like). SUBDMA is a network code (e.g., a location code) that corresponds to at least one source (e.g., a sensor device) providing the input stream data, and lps (litre per second) and MGa (mega million gallons) are measurement units.

The above input stream data pertaining water flow rate (and/or water pressure) and corresponding valves or distribution components are filtered, parsed and validated. This input stream data is then analyzed to generate one or more events and further communicate a notification message comprising a command to a corresponding source (e.g., a water supply department). Based on the analysis, the events generation system 100 has identified (or predicted) a pipe location that is likely to burst. The analysis may comprise for example, determining the pressure of water flow rate, and the strength of the portion of the pipe at the pipe location, and duration that the pipe can withstand before the burst, and the like. The pipe burst location is notified to the water supply department so that appropriate actions are taken (e.g., rectifying the pipe at the location, or shutting down the valve pertaining to the flow of water from the pipe that is likely to burst.

FIG. 5, with reference to FIGS. 1 through 4, is an example of a metadata structure that includes one or more processes according to an embodiment of the present disclosure. The metadata structure may be stored in a metadata repository in the memory 102, in an example embodiment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of processing input stream data to generate events for taking one or more controlled decisions. The embodiment, thus provides the events generation system 100 that generates one or more events based on an analysis being performed on input stream data. Unlike conventional systems and methods which fail to (i) execute real time streams, and (ii) integrate with big data platforms, the events generation system 100 processes in real time input stream data obtained from one or more sources, filters the input stream data in real time to identify and authenticate sources and obtain one or more authentic sources. The events generation system 100 further validates the filtered input stream data by parsing the filtered input stream data and converting the filtered input stream data (received in one or more formats), to a specific format that is easily understood, and can be interpreted by the system 100 (or any other systems coupled to the system 100) and obtains validated data. This above functionalities may be achieved by the system 100 using real time stream processors like apache spark and apache storm, in an example embodiment. The events generation system 100 further performs analysis on the validated data and the authentic sources by applying one or more predefined metadata driven logics and rules, based on which one or more events are generated. The events may be in any form for example, alerts, commands, messages, email services, and the like. The read the data from real time stream processors, for example, but are not limited to apache spark, apache storm, and the like.

The embodiments of the present disclosure enable the events generation system 100 to execute the process over big data platform on real time mode using a relational database for example, apache phoenix. In other words, the events generation system 100 acts as a metadata based orchestration system to handle real time Big Data real time streams and creates one or more processes (e.g., business processes, system driven processes) through metadata over a big data platform. The embodiments of the present disclosure further enable the events generation system 100 to orchestrate real time systems for Wi-Fi, GPS and Sensor data, and produces results in one or more messaging services, for example, but are not limited to, Kafka Active MQ, and the like.

Additionally, the embodiments of the present disclosure enable the events generation system 100 to asynchronously perform self-diagnostics on the system itself to determine (or check) for failure of input stream data without hampering the overall performance of the system. Such check may comprise, for example, but is not limited to computing one or more statistics related to a computer system such as determining available memory for data processing, determining available power consumption, determining availability of one or more hardware processors, and other system components to perform one or more functionalities. This output from the self-diagnostics enables the events generation system 100 optimize the system capabilities for example, but are not limited to reducing memory space, increasing in processing data to a greater speed, and at the same time enabling reduction in power usage. Furthermore, the embodiments of the present disclosure enable the events generation system 100 to process real time events using one or more parallel processing mechanisms to enable quick response time (e.g., receive the events from multiple sources) so that the system 100 can process those events in parallel. Moreover, the ability to perform self-diagnostics by the events generation system 100 enables a system (e.g., a computer system) to identify one or more processes for example, but are not limited to one or more business processes, one or more system driven processes, and the like being executed in the computer system, that are either malfunctioning, or consuming more power, more memory, more processing time, and the like. Alternatively, the events generation system 100 may be an integral part of the computer system or externally connected to the computer system via one or more communication interfaces. The events generation system 100 enables rectification of the identified processes that are either malfunctioning, or consuming more power, more memory, more processing time, and the like and accordingly optimize system resources (e.g., memory optimization, increase in processing speed, power optimization by enabling power saving mode).

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), BLU-RAY, and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing, devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interlace devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor implemented method comprising:
    obtaining, by a hardware processor in real time, an input stream data from one or more sources;
    filtering, by said hardware processor in said real time, said input stream data by identifying one or more authentic sources from said one or more sources to obtain filtered input stream data;
    parsing, by said hardware processor in said real time, said filtered input stream data such that said filtered input stream data is validated to obtain validated data in a specific data format;
    applying, by said hardware processor in said real time, one or more metadata driven logics and one or more predefined rules on said validated data in said specific data format and said one or more authentic sources;
    performing, by said hardware processor in said real time, an analysis on said validated data in said specific data format and on corresponding said one or more authentic sources; and
    generating, by said hardware processor in said real time, one or more real time events based on said analysis.

2. The processor implemented method of claim 1, wherein generating one or more real time events comprises performing a comparison of a specific timestamp from said input stream data with a predetermined threshold defined in said one or more predefined rules.

3. The processor implemented method of claim 1, wherein generating one or more real time events comprises performing a comparison of a specific count from said input stream data with a predetermined threshold defined in said one or more predefined rules.

4. The processor implemented method of claim 1, further comprising communicating a notification message comprising a command to said one or more authentic sources based on said analysis.

5. A system comprising:
    a memory storing instructions;
    one or more communication interfaces;
    one or more hardware processors coupled to said memory using said one or more communication interfaces, wherein said one or more hardware processors are configured by said instructions to
        obtain, in real time, input stream data from one or more sources,
        filter, in said real time, said input stream data by identifying one or more authentic sources from said one or more sources to obtain filtered input stream data,
        parse, in said real time, said filtered input stream data such that said filtered input stream data is validated to obtain validated data in a specific data format,
        apply, in said real time, one or more metadata driven logics and one or more predefined rules on validated data in said specific data format and said one or more authentic sources,
        perform, in said real time, an analysis on said validated data in said specific data format and on corresponding said one or more authentic sources, and
        generate, in said real time, one or more real time events based on said analysis.

6. The system of claim 5, wherein said one or more real time events are generated by performing a comparison of a specific timestamp from said input stream data with a predetermined threshold defined in said one or more predefined rules.

7. The system of claim 5, wherein said one or more real time events are generated by performing a comparison of a specific count from said input stream data with a predetermined threshold defined in said one or more predefined rules.

8. The system of claim 5, wherein said one or more hardware processors are further configured by said instructions to communicate a notification message comprising a command to said one or more authentic sources based on said analysis.

9. One or more non-transitory machine readable information storage mediums comprising one or more instructions which when executed by one or more hardware processors causes:
    obtaining, by a hardware processor in real time, an input stream data from one or more sources;

filtering, by said hardware processor in said real time, said input stream data by identifying one or more authentic sources from said one or more sources to obtain filtered input stream data;

parsing, by said hardware processor in said real time, said filtered input stream data such that said filtered input stream data is validated to obtain validated data in a specific data format;

applying, by said hardware processor in said real time, one or more metadata driven logics and one or more predefined rules on said validated data in said specific data format and said one or more authentic sources;

performing, by said hardware processor in said real time, an analysis on said validated data in said specific data format and on corresponding said one or more authentic sources; and generating, by said hardware processor in said real time, one or more real time events based on said analysis.

10. The one or more non-transitory machine readable information storage mediums of claim 9, wherein generating one or more real time events comprises performing a comparison of a specific timestamp from said input stream data with a predetermined threshold defined in said one or more predefined rules.

11. The one or more non-transitory machine readable information storage mediums of claim 9, wherein generating one or more real time events comprises performing a comparison of a specific count from said input stream data with a predetermined threshold defined in said one or more predefined rules.

12. The one or more non-transitory machine readable information storage mediums of claim 9, further comprising communicating a notification message comprising a command to said one or more authentic sources based on said analysis.

* * * * *